(12) United States Patent
Toscano

(10) Patent No.: US 11,689,681 B2
(45) Date of Patent: Jun. 27, 2023

(54) METHOD AND SYSTEM FOR DISTRIBUTING AND RECEIVING FAX TRANSMISSIONS VIA A DATA CONNECTION THAT IS OWNED BY A SERVICE PROVIDER

(71) Applicant: J2 Cloud Services, LLC, Los Angeles, CA (US)

(72) Inventor: Francis Toscano, Kendall Park, NJ (US)

(73) Assignee: CONSENSUS CLOUD SOLUTIONS, LLC, Los Angeles, CA (US)

( * ) Notice: Subject to any disclaimer, the term of this patent is extended or adjusted under 35 U.S.C. 154(b) by 0 days.

(21) Appl. No.: 17/473,854

(22) Filed: Sep. 13, 2021

(65) Prior Publication Data

US 2023/0083081 A1 Mar. 16, 2023

(51) Int. Cl.
*H04N 1/327* (2006.01)
*H04L 65/1043* (2022.01)
(Continued)

(52) U.S. Cl.
CPC ..... *H04N 1/32708* (2013.01); *H04L 65/1043* (2013.01); *H04L 65/1104* (2022.05);
(Continued)

(58) Field of Classification Search
CPC ............. H04L 65/1104; H04L 65/1106; H04L 65/1043; H04N 1/32726; H04N 1/32765
(Continued)

(56) References Cited

U.S. PATENT DOCUMENTS

| 8,639,754 B2 | 1/2014 | Vendrow |
| 9,042,532 B2 | 5/2015 | Watts |

(Continued)

FOREIGN PATENT DOCUMENTS

| JP | 2012060632 A | 3/2012 |
| JP | 2013121153 A | 6/2013 |

(Continued)

OTHER PUBLICATIONS

PCT International Search Report and the Written Opinion of the International Searching Authority, or the Declaration for PCT/US2022/026046, dated Aug. 5, 2022, 10 pages.
(Continued)

*Primary Examiner* — Maria El-Zoobi
(74) *Attorney, Agent, or Firm* — Womble Bond Dickinson (US) LLP

(57) ABSTRACT

Methods and systems are described for distributing and receiving fax transmissions via a data connection that is owned by a service provider. In one embodiment, a fax server receives a signaling protocol invite from a telephone service provider in response to the telephone service provider receiving, over a circuit switched network and from a source device, an incoming call signal to a fax telephone number of the service provider. The server responds to the invite by establishing a data connection based on the signaling protocol with the telephone service provider, where the data connection is owned by the service provider. The server receives an incoming fax message that is in a fax format and is routed by the telephone service provider as the source device transmits the incoming fax message. The server transmits the fax message to a destination address.

20 Claims, 6 Drawing Sheets

(51) Int. Cl.
*H04L 65/1104* (2022.01)
*H04L 65/1106* (2022.01)

(52) U.S. Cl.
CPC ..... *H04L 65/1106* (2022.05); *H04N 1/32726* (2013.01); *H04N 1/32765* (2013.01)

(58) Field of Classification Search
USPC .................................................. 379/100.15
See application file for complete search history.

(56) References Cited

U.S. PATENT DOCUMENTS

| | | | |
|---|---|---|---|
| 9,734,541 | B1 | 8/2017 | Pinsonneault |
| 10,334,119 | B2* | 6/2019 | Freeman ............... H04W 4/16 |
| 10,694,067 | B2 | 6/2020 | Toscano et al. |
| 2002/0101620 | A1 | 8/2002 | Sharif et al. |
| 2004/0252349 | A1 | 12/2004 | Green |
| 2005/0275871 | A1 | 12/2005 | Baird et al. |
| 2006/0031364 | A1 | 2/2006 | Hamilton et al. |
| 2006/0133360 | A1 | 6/2006 | Veschi |
| 2006/0209333 | A1 | 9/2006 | Takida |
| 2008/0104408 | A1 | 5/2008 | Mayer |
| 2009/0067418 | A1* | 3/2009 | Toscano ............. H04N 1/00214 370/357 |
| 2009/0190159 | A1 | 7/2009 | Toscano et al. |
| 2010/0060926 | A1 | 3/2010 | Smith et al. |
| 2010/0161993 | A1 | 6/2010 | Mayer |
| 2010/0208726 | A1* | 8/2010 | Oliszewski ........ H04N 1/32704 358/1.15 |
| 2010/0214590 | A1 | 8/2010 | Ray et al. |
| 2011/0119088 | A1 | 5/2011 | Gunn et al. |
| 2011/0179266 | A1 | 7/2011 | Popesco |
| 2011/0310890 | A1 | 12/2011 | Yanagi |
| 2012/0212763 | A1 | 8/2012 | Honma |
| 2013/0038894 | A1 | 2/2013 | Murphy |
| 2013/0096938 | A1 | 4/2013 | Stueckemann et al. |
| 2013/0208307 | A1 | 8/2013 | Oliszewski |
| 2014/0240760 | A1 | 8/2014 | Dowling et al. |
| 2014/0268219 | A1 | 9/2014 | Ho et al. |
| 2015/0081325 | A1 | 3/2015 | Pletcher et al. |
| 2015/0195418 | A1* | 7/2015 | Toscano ............. H04N 1/00206 358/1.15 |
| 2015/0234984 | A1 | 8/2015 | Singer et al. |
| 2015/0278474 | A1 | 10/2015 | Stueckemann et al. |
| 2016/0042483 | A1 | 2/2016 | Vo et al. |
| 2016/0342752 | A1 | 11/2016 | Stueckemann et al. |
| 2017/0064092 | A1 | 3/2017 | Lennstrom |
| 2017/0070513 | A1 | 3/2017 | Robertson |
| 2017/0187731 | A1 | 6/2017 | Hatta |
| 2018/0249038 | A1 | 8/2018 | Lehavi et al. |
| 2018/0294048 | A1 | 10/2018 | Blumenthal et al. |
| 2019/0052770 | A1 | 2/2019 | Kamens et al. |
| 2019/0156055 | A1 | 5/2019 | Rosenberg et al. |
| 2019/0222717 | A1 | 7/2019 | Watts et al. |
| 2019/0267123 | A1 | 8/2019 | Stueckemann et al. |
| 2019/0356786 | A1 | 11/2019 | Freeman |
| 2020/0076965 | A1 | 3/2020 | Kwon |
| 2020/0106923 | A1 | 4/2020 | Watts et al. |
| 2020/0327967 | A1 | 10/2020 | Tevis et al. |
| 2020/0412887 | A1 | 12/2020 | Cichielo et al. |

FOREIGN PATENT DOCUMENTS

| | | |
|---|---|---|
| JP | 2015226174 A | 12/2015 |
| KR | 1020180124507 A | 11/2018 |
| KR | 1020190102763 A | 9/2019 |

OTHER PUBLICATIONS

PCT International Search Report and Written Opinion for PCT/US2022/031638, dated Sep. 8, 2022, 10 pages.
PCT International Search Report and the Written Opinion of the International Searching Authority, or the Declaration, for PCT/US2022/018183, dated Jun. 9, 2022, 11 pages.
PCT International Search Report and Written Opinion of the International Searching Authority, or the Declaration, for PCT/US2022/043148, dated Dec. 27, 2022.
Non-Final Office Action dated Dec. 14, 2022 for U.S. Appl. No. 17/240,851.
Non-Final Office Action for U.S. Appl. No. 17/240,887 dated Oct. 27, 2021, 17 pages.
Final Office Action for U.S. Appl. No. 17/240,887, dated Mar. 28, 2022, 13 pages.
Notice of Allowance for U.S. Appl. No. 17/338,582 dated Aug. 10, 2022.
Restriction Requirement for U.S. Appl. No. 17/240,851 dated Jul. 13, 2022.
Notice of Allowance for U.S. Appl. No. 17/189,088 dated May 25, 2022.
Notice of Allowance for U.S. Appl. No. 17/189,088 dated Jul. 11, 2022.
Non-Final Office Action for U.S. Appl. No. 17/189,088 dated Dec. 8, 2021.
Notice of Allowance for U.S. Appl. No. 17/240,887 dated Jul. 13, 2022.
Corrected Notice of Allowability for U.S. Appl. No. 17/338,582 dated Sep. 13, 2022.
Corrected Notice of Allowability for U.S. Appl. No. 17/338,582 dated Sep. 27, 2022.
Corrected Notice of Allowability for U.S. Appl. No. 17/338,582 dated Oct. 24, 2022.
Corrected Notice of Allowability for U.S. Appl. No. 17/338,582 dated Nov. 17, 2022.
Corrected Notice of Allowability for U.S. Appl. No. 17/189,088 dated Aug. 11, 2022.
Corrected Notice of Allowability for U.S. Appl. No. 17/189,088 dated Oct. 14, 2022.
Corrected Notice of Allowability for U.S. Appl. No. 17/240,887 dated Aug. 18, 2022.
Corrected Notice of Allowability for U.S. Appl. No. 17/240,887 dated Sep. 20, 2022.
Corrected Notice of Allowability for U.S. Appl. No. 17/240,887 dated Oct. 13, 2022.

* cited by examiner

Process 60

Start

61 — Receive a signaling protocol invite from a telephone service provider in response to the telephone service provider receiving, over a circuit switched network and from a source device, an incoming call signal to a fax telephone number of a cloud-based service provider 62 — Respond to the invite by establishing, over a data network, a data connection based on the signaling protocol with the telephone service provider, wherein the data connection is owned by the cloud-based service provider 63 — Receive, through the data connection, an incoming fax message that is in a fax format and is routed by the telephone service provider as the source device transmits the incoming fax message via the incoming call signal over the circuit switched network 64 — Transmit, over the data network, the fax message to a destination address

End

FIG. 6

METHOD AND SYSTEM FOR DISTRIBUTING AND RECEIVING FAX TRANSMISSIONS VIA A DATA CONNECTION THAT IS OWNED BY A SERVICE PROVIDER

FIELD

An embodiment of the disclosure is related to a fax system that distributes and receives fax transmissions via a data connection that is owned by a (e.g., cloud-based) service provider. Other embodiments are also described.

BACKGROUND

Fax messaging continues to be an important avenue for delivery of secure messages between individuals worldwide despite the proliferation of message delivery services that use the Internet. Traditional fax messaging services require both a dedicated fax machine and a dedicated fax number to receive a fax transmission. Modern fax messaging services have eliminated the requirement for a dedicated fax machine, utilizing the Internet to provide greater flexibility for subscribers of those services to transmit and receive fax messages. For instance, a subscriber of a modern fax messaging service is assigned a direct inward dialing (DID) telephone number, which the subscriber distributes to others who wish to send a fax message to the subscriber. The DID telephone number is in effect the subscriber's individual fax number. When an incoming fax transmission is received at a particular DID telephone number, the fax messaging service generates a fax message from the fax transmission in a format that is suitable for transmission over a data network such as the Internet, and sends the fax message to the subscriber (e.g., to the subscriber's e-mail address).

SUMMARY

Voice and data communications systems such as the Public Switched Telephone Network (PSTN) are currently used to transfer image and text data transmitted by facsimile ("fax") machines in addition to the normally carried voice traffic. For instance, fax machines translate a physical document into data, which is then transmitted to a dedicated fax telephone number, over the PSTN. This data is normally received for printout or storage of the image and text on a destination fax machine or computer for use by the recipient. When setting up telephone and fax service, a consumer and a telephone company (or telephone service provider) may enter into a contract that specifies a number of available or "free" minutes that are usable across one or more dedicated voice and fax lines (or numbers) over a certain time period (e.g., a month). These same customers, however, may wish to switch to more modern fax services to receive incoming fax faxes through the Internet. In which case, incoming fax transmissions may be forwarded (or routed) by a fax service provider through a data (e.g., computer) network to one or more recipients, thus circumventing fax transmission to a dedicated fax telephone number over the PSTN. Taking advantage of modern fax methods is more reliable than traditional methods, and is more cost effective due to removing the need for a dedicated fax telephone number to which fax transmissions are sent.

In some cases, however, customers cannot quickly and easily transition from traditional faxing to the more modern fax services. For instances, telephone contracts between customers and telephone companies may be long-term agreements (e.g., several years) for use of a telephone company's telecommunication services for routing fax transmissions (e.g., over the PSTN). Therefore, there is a need for providing electronic fax services for users (e.g., cloud-based service providers) while allowing the users to maintain their contractual obligations with telephone companies.

The instant disclosure is directed to a method and a system for distributing (or routing) and receiving fax transmissions via a data connection that is owned by a (cloud-based) service provider (e.g., a subscriber or user of fax services who has a contractual obligation to maintain telecommunication services with a telephone company). Specifically, a (e.g., fax processing software executing on a) fax server of a fax service provider may receive a signaling protocol invite from a telephone service provider (or telephone company) in response to the service provider receiving, over a circuit switched network (e.g., PSTN), an incoming call signal to a fax telephone number of the service provider. The server may respond to the invite by establishing, over a data network, a data connection based on the signaling protocol with the telephone service provider, where the data connection is owned by the cloud-based service provider. For instance, the data connection may be through a session initiation protocol (SIP) trunk that is owned by (e.g., is a part of a customer account of) the cloud-based service provider with the telephone company. The fax server may receive, through the data connection, an incoming fax message that is in a fax format and is routed by the telephone service provider as a source device transmits the incoming fax message via the incoming call signal over the PSTN. In one embodiment, to receive the fax message the cloud-based service provider may instruct the telephone company to redirect (or terminate) fax telephone numbers to a specific location associated with the fax server (e.g., an Internet Protocol (IP) address of the fax server). The fax server may transmit, over the data connection, the fax message to a destination address (e.g., an IP address or a domain name). As a result, fax messages that are traditionally sent via the PSTN by source devices to users may be redirected to the fax server in order to transmit the message electronically, while the users maintain their contractual obligations to telephone companies.

In another embodiment, the fax server may also transmit fax transmissions via the SIP trunk owned by the cloud-based service provider. For instance, the server receives, over a data network and from a cloud-based service provider, a fax transmission to be transmitted to a fax telephone number (e.g., using the PSTN) of a destination device. The server converts the fax transmission into a fax format (e.g., into a Tagged Image File Format (TIFF)). The server establishes, over the data network and using the fax telephone number, a data connection with the destination device via the cloud-based service provider's SIP trunk, and transmits the fax transmission to the destination device. In particular, the fax server may receive credentials (e.g., a username and password) for a telephone service provider account that is owned by (e.g., a part of a contractual obligation of) the cloud-based service provider. In which case, when establishing the data connection, the fax server may transmit a signaling protocol invite to the telephone service provider that includes 1) the fax telephone number and 2) the credentials for authorizing (or authenticating) the fax service provider to transmit the fax transmission via the cloud-based service provider's SIP trunk. Thus, along with receiving fax transmissions through the SIP trunk owned by the cloud-based service provider, the fax server may also transmit fax transmissions via a data connection through the SIP trunk.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the disclosure are illustrated by way of example and not by way of limitation in the figures of the accompanying drawings in which like references indicate similar elements. It should be noted that references to "an" or "one" embodiment of the disclosure in this disclosure are not necessarily to the same embodiment, and they mean at least one. Also, a given figure may be used to illustrate the features of more than one embodiment of the disclosure, and not all elements in the figure may be required for a given embodiment.

FIG. 6 is a flowchart of one embodiment of a process to receive a fax transmission from a source device via the SIP trunk that is owned by the user.

DETAILED DESCRIPTION

Several embodiments of the disclosure with reference to the appended drawings are now explained. Whenever aspects of the embodiments described here are not explicitly defined, the scope of the disclosure is not limited only to the parts shown, which are meant merely for the purpose of illustration. Also, while numerous details are set forth, it is understood that some embodiments of the disclosure may be practiced without these details. In other instances, well-known circuits, structures, and techniques have not been shown in detail so as not to obscure the understanding of this description.

References in the specification to "one embodiment" or "an embodiment" means that a particular feature, structure, or characteristic described in conjunction with the embodiment can be included in at least one embodiment, but every embodiment may not necessarily include the particular feature, structure, or characteristic. Moreover, such phrases are not necessarily referring to the same embodiment.

Figure 1:
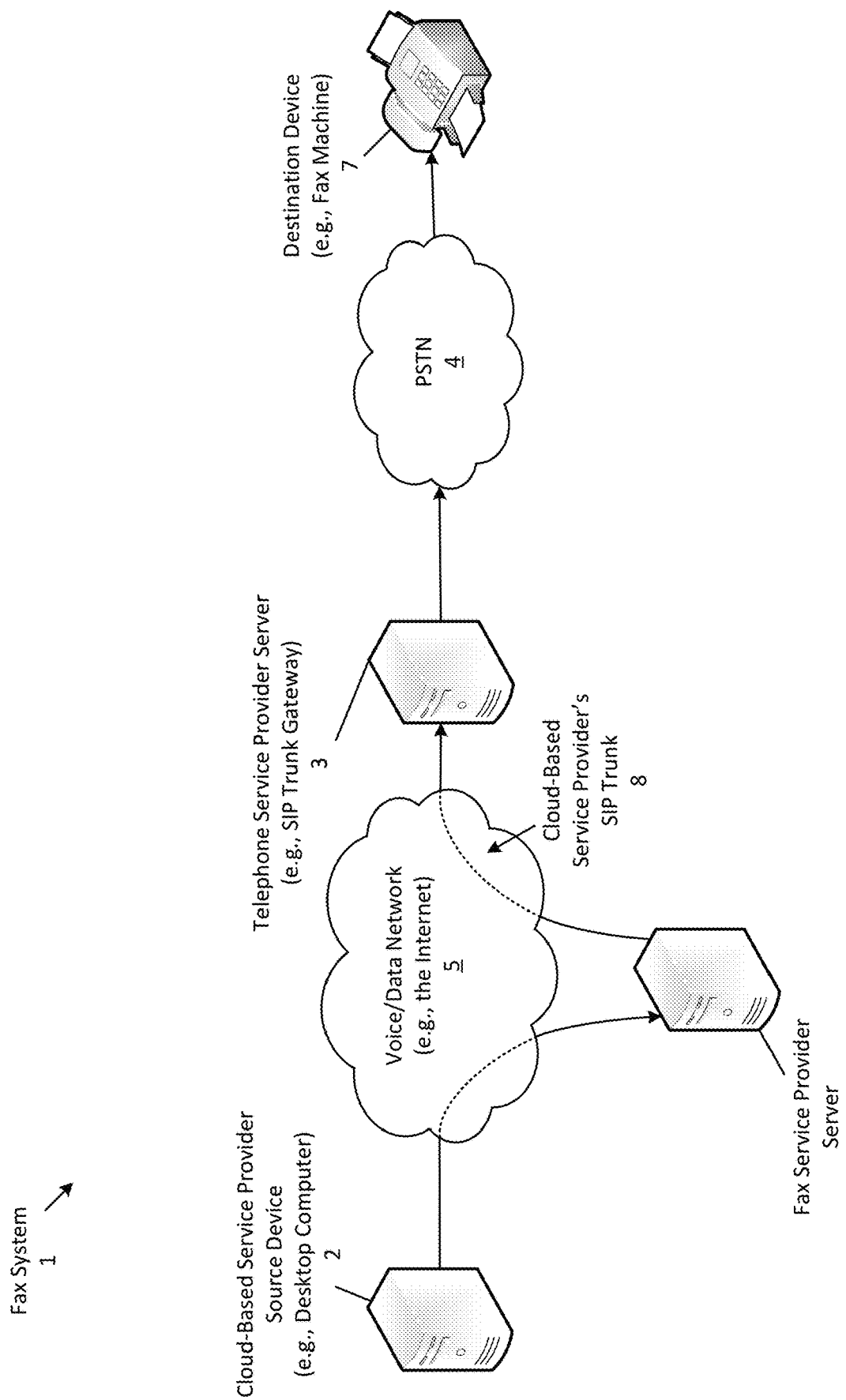
FIG. 1 is a block diagram illustrating a fax system 1 for transmitting fax transmissions via a service provider's Session Initiation Protocol (SIP) trunk, according to some embodiments.

FIG. 1 is a block diagram illustrating a fax system 1 for transmitting fax transmissions via a user's (or cloud-based service provider's) Session Initiation Protocol (SIP) trunk, according to some embodiments. Specifically, this figure shows a system architecture in which fax transmissions of a cloud-based service provider (e.g., fax transmissions sent by the provider) are forwarded (or routed) to a destination device by a fax service provider server 6 via the cloud-based service provider's SIP trunk 8.

The fax system 1 includes a cloud-based service provider (hereafter may be referred to as "service provider") source device 2, a fax service provider server (hereafter may be referred to as "fax server") 6, a voice/data (e.g., computer) network (e.g., the Internet) 5, a telephone service provider server (hereafter may be referred to as "telephone server") 3, a Public Switched Telephone Network (PSTN) 4, and a destination device 7. In one embodiment, the system may include more or less elements (or devices), such as having one or more source devices and/or one or more destination devices.

In one embodiment, the voice/data network 5 may include infrastructure that enables one or more devices to send and receive fax transmissions (e.g., as electronic messages), such as routers, access points, one or more servers, etc. In some embodiments, the network may also include one or more cell towers, all of which may be part of a communication network that supports data transmission (and/or voice calls) for mobile devices (e.g., a 4G Long Term Evolution (LTE) network). In some embodiments, the PSTN 4 may be a combination (e.g., having one or more) circuit-switched (telephone) networks that may be operated by one or more telephony operators in order to allow telephones and/or fax machines to communicate with one another.

The telephone server 3 is configured to communicatively couple the fax server 6 to one or more destination devices, such as device 7 in order to route fax transmissions from the fax server to the destination device. In one aspect, the server 3 may be (owned and) operated by a telephone service provider (or telephone company), which may provide Voice over Internet Protocol (VoIP) services, such as an Internet Telephony Service Provider (ITSP). Specifically, the server 3 is configured to establish a telecommunication (e.g., VoIP) connection between the fax server 6, one or more destination devices (e.g., device 7), and/or one or more source devices, such as source device 20 in FIG. 2, using any type of signaling (e.g., VoIP) protocol, such as H.323 protocol, Media Gateway Control Protocol (MGCP), or SIP.

In one embodiment, the telephone server 3 may be (or include) a SIP trunk gateway that is configured to utilize the cloud-based service provider's SIP trunk 8, through which a data connection between the gateway and the server 6 is established in order to exchange data between the fax server 6 and the destination device (e.g., through the PSTN 4). In particular, the gateway receives digital data from the fax service provider server 6 via the SIP trunk 8 and converts the data into analog signals that are transmitted through the PSTN 4 to the destination device 7. More about the fax server using the SIP trunk is described herein.

In one embodiment, the SIP trunk 8 may be "owned" by the cloud-based service provider (of the source device 2, for example). In particular, the cloud-based service provider may have purchased the trunk from the telephone provider, where the trunk is a part of the service provider's telephone account (or commitments with the telephone service provider). In this way, the telephone provider may provide the cloud-based service provider sole access (e.g., not allowing or authenticating other customers with the telephone provider) to transmit and receive data via the SIP trunk 8. Thus, the service provider may pay a monthly fee (or bill) in order to take advantage of VoIP services.

As described herein, the fax service provider may be authorized by the cloud-based service provider to use the provider's SIP trunk 8 in order to transmit (and/or receive) fax transmissions over the data network and PSTN. Specifically, the cloud-based service provider may specify with the telephone provider that VoIP sessions (or calls) originating from the fax server are to use the service provider's SIP trunk 8 for transmitting data. For instance, the service provider may provide credentials (e.g., an IP address or domain name) associated with the fax server to the telephone provider (e.g., by adding the credentials to the service provider's telephone account with the telephone provider). Upon receiving a VoIP session request (e.g., a signaling protocol invite), the telephone server may determine whether the invite includes credentials associated with the service provider. If so, the telephone server may continue the signaling protocol process for establishing the VoIP session that uses the service provider's SIP trunk 8. Along with (or in lieu of) specifying that VoIP sessions may be originated by the fax server 6, the service provider may specify the fax server as a termination (or end) point for a VoIP session (e.g., being the device that connects via the SIP trunk to a source device that has originated a voice (or VoIP) call). In which case, the service provider may provide the credentials to the telephone provider to associate the credentials with one or more telephone (e.g., fax telephone) numbers associated with the service provider (e.g., associated with the provider's SIP trunk), such that when a call is received at one of those numbers (e.g., by any source device, such as a fax machine), the fax server 6 is the termination point for the call to receive data of the call. In one embodiment, the service provider may specify in the provider's account (e.g., within preferences), which telephone numbers are to terminate at the fax server. More about these operations is described herein.

In one embodiment, the credentials may include other authenticating information for allowing the fax server 6 to establish a data connection with a destination device via the service provider's SIP trunk. For instance, the credentials may include a username and password that is associated with (e.g., the telephone account of) the service provider. Thus, when initiating the signaling protocol process, the fax server may transmit these credentials (e.g., in the signaling protocol invite) to the telephone server, which verifies the fax server 6 identity to allow access to the service provider's SIP trunk 8.

As shown, the destination device 7 is a fax machine that is coupled to the telephone service provider server 3 via the PSTN 4. In one embodiment, the destination device may be any electronic device that is capable of receiving fax transmissions via the PSTN. More about receiving fax transmissions via the PSTN is described herein.

In one embodiment, the cloud-based service provider source device 2 (e.g., an electronic device that is owned and/or operated by a cloud-based service provider) is (e.g., communicatively) coupled to the server 6 via the computer network 5 in order to send fax transmissions to the server. As shown, the source device is a desktop computer. In another embodiment, the source device may be any type of device that is capable of transmitting fax transmissions (e.g., as electronic messages) over the computer network to the fax service provider server 6 (e.g., a laptop computer, a tablet computer, a server, etc.). In particular, the source device may include fax software, which when executed by the device is configured to send fax transmissions as electronic messages that include fax files (or fax messages). Specifically, the software may be configured to receive (e.g., via a Graphical User Interface (GUI) displayed on a display screen coupled to the desktop) an address for the fax service provider server to which a document is to be transmitted. The desktop may establish a connection with the server, via the network 5 and transmit the document to the server. More about transmitting fax messages to the server is described herein.

In another embodiment, the source device may be a portable device (e.g., a tablet computer) that is configured to connect to a wireless network (e.g., a wireless local area network (WLAN)) of the network 5, which when connected may be configured to communicate with (e.g., transmit fax transmissions to) the fax service provider server 6. In another embodiment, the source device may be a mobile device (e.g., a smart phone) that is configured to connect to the communication network (e.g., LTE network) of the data network in order to transmit fax data to the fax service provider server, as described herein.

In one embodiment, the source device may transmit a fax transmission as an electronic message that includes a fax file (message) to the server 6 in order for the server to distribute the fax file to one or more destination addresses, as described herein. In particular, the electronic message may be any type of message in any type of format that includes the fax file. For example, the electronic message may be an e-mail (e.g., a Simple Mail Transfer Protocol (SMTP) message that the source device transmits to an e-mail address associated with the fax server, over the data network 5. Specifically, the e-mail may include the fax file (e.g., one or more electronic documents) as an attachment to the e-mail or may be in a body of the e-mail, which may be formatted according to the Multipurpose Internet Mail Extensions (MIME) protocol.

As another example, the source device may establish a communication data link or data connection (e.g., via an Application Programming Interface (API)) with the fax server, and may transmit the electronic message over the link. In particular, the source device may establish, over the computer network and via the API, a data connection using an address of the server, for example an Internet Protocol (IP) address or a domain name. Once established, the source device may transmit the electronic message (e.g., as one or more data packets, such as IP packets) that includes the fax transmission (or more specifically the fax file) over the data connection. In another embodiment, the source device may establish a connection via a website that is hosted by (or on) the fax service provider server 6. In this case, the address of the server may be a Uniform Resource Locator (URL), which indicates the domain name associated with the server. The source device may establish a data connection (e.g., using any communication protocol, such as Transmission Control Protocol/Internet Protocol (TCP/IP)) to the URL according to any data transfer (application) protocol, such as Hypertext Transfer Protocol (HTTP), File Transfer Protocol (FTP), etc. In another embodiment, the source device may use any (e.g., Application layer) protocol in the device's protocol stack to establish a connection with the server and transmit the data. In some embodiments, the source device may use any method to transmit the electronic message to the server.

In another embodiment, the electronic message may be transmitted to the fax service provider server 6, via a secure communication data connection. Specifically, the source device may establish, over the computer network a data connection with the fax server according to the server's address (e.g., IP address) and using an encryption protocol, such as Secure Sockets Layer (SSL), Transport Layer Security (TLS), etc. For instance, to access the website hosted by the fax server, the destination device may use the application layer protocol HTTP over TLS or SSL (e.g., HTTPS). Once the secure communication data connection established, the source device (encrypts and) transmits data (e.g., electronic messages) to the server according to the encryption protocol. In some embodiments, the source device may establish a secure communication tunnel with the server. For instance, the source device may establish using the IP address or domain name of the fax server, a Virtual Personal Network (VPN) connection with the fax server. Once established, the source device may transmit the electronic message via the VPN connection. For instance, the source device may establish a communication data connection with a VPN server through which (e.g., a VPN connection is established in which) the source device may communicate with the server (e.g., using any communication protocol, such as HTTPS). As another example, once the secure communication tunnel is established, the source device may transmit an e-mail (SMTP message) with the fax message attached, as described herein. In some embodiments, the fax server 6 may establish the (e.g., secure) connection with the source device. In another embodiment, one or more electronic messages may be transmitted via one connection. For instance, once a connection is established, the same connection may be used for exchanging data between the device and server.

In one embodiment, the fax message may be transmitted by the source device to the server 6 in any format, such as Portable Document Format (PDF), or a fax file format (e.g., a format in which a fax transmission may be sent over the PSTN), such as Tagged Image File Format (TIFF). In another embodiment, the fax message may be a document that includes text and/or images. In some embodiments, the fax message may be a searchable electronic document, such as a searchable PDF. In another embodiment, the fax message may be in a format that is executable by one or more applications that allow a user to search, add, remove, and/or edit data (e.g., text, images, etc.) in the message. For example, the message may be in a word processing format that is executable by a word processing software application, a spreadsheet format that is executable by a spreadsheet software application, a presentation format that is executable by a presentation application. In another embodiment, the fax file may be in any file format that is editable and/or searchable.

In some embodiments, the electronic message may include information regarding the fax file contained therein. For instance, the message may include an outbound (recipient or destination) address, such as a fax telephone number to which the fax file contained therein is to be transmitted by the fax service provider server 6. Returning to the e-mail example, the e-mail address to which the electronic message is sent by the source device may include the fax telephone number. For example, the fax telephone number, to which the service provider wants the fax file of the electronic message to be distributed (e.g., over the PSTN) by the fax server, may be the user name of the e-mail address and the domain name of the e-mail address may be associated with the fax service provider. In another embodiment, the fax telephone number may be within the body of the e-mail or in the subject line. In another embodiment, the fax telephone number may be a part of the electronic message, such as being included as metadata in one or more headers of one or more IP data packets that are used to transmit the electronic message. In another embodiment, the fax telephone number may be transmitted separately from the electronic message that includes the fax file (e.g., the fax telephone number may be transmitted in one or more data packets before or after the electronic message is transmitted by the source device).

In another embodiment, the message may include other information that indicates where the fax file is to be transmitted. For instance, the information may include contact information for a recipient (or a recipient's electronic device) that the service provider wishes the fax file to be transmitted. In which case, the fax service provider server 6 may use the information to determine a fax telephone number associated with the user. Specifically, the fax server may perform a table lookup into a data structure (e.g., such as subscriber data 15 shown in FIG. 3) that includes contact information (e.g., a contact's list) for the service provider to identify an outbound address (e.g., fax telephone number) associated with the contact information of the message. More about subscriber data is described herein.

The fax service provider server 6 may be a stand-alone server computer or a cluster of server computers (e.g., as a part of a cloud computing system) configured to perform one or more fax service provider operations, as described herein. In one embodiment, the fax server is configured to distribute incoming fax transmissions from one or more service provider source devices to one or more destination devices, by establishing a data connection with the destination devices, as shown in this figure, for example. Specifically, the fax server 6 may receive an incoming fax transmission from the source device 2, along with additional information such as a fax telephone number to which the fax transmission is to be forwarded by the fax server. The fax server may set up a VoIP session with the destination device 7 through the telephone server 3 (e.g., using the service provider's SIP trunk 8) in order to transmit a fax. For example, the fax server may transmit a signaling protocol invite (e.g., using any signaling protocol, such as H.323, MGCP, and SIP) that includes credentials of the fax server to the telephone server and other information, such as a (e.g., fax) telephone number of the destination device 7 to which the fax server intends to transmit the fax. Upon verifying the credentials (e.g., verifying the username and password), the telephone server may continue to establish the VoIP session by transmitting an incoming call signal (e.g., an incoming call ringing alert) to the destination device 7 via the PSTN 4. Upon receiving an answering signal from the destination device, the telephone server may transmit an acknowledgement message to the fax server 6, at which point a data connection (e.g., a Real-Time Transportation Protocol (RTP) connection) is established between the telephone server and the fax server via the SIP trunk 8. Once established, the fax server 6 may transmit the fax as digital data (e.g., using or according to any fax protocol, such as T.38 protocol) to the telephone server, which converts the data into an analog signal. Specifically, the telephone server may utilize Dual-Tone Multi-Frequency (DTMF) signaling, in which the fax data is transmitted through the PSTN to the destination device in the form of audio-frequency tones (e.g., a fax tone as per the Group 3 protocol). Once the fax data has been transmitted, the fax server may terminate the VoIP session.

Figure 2:
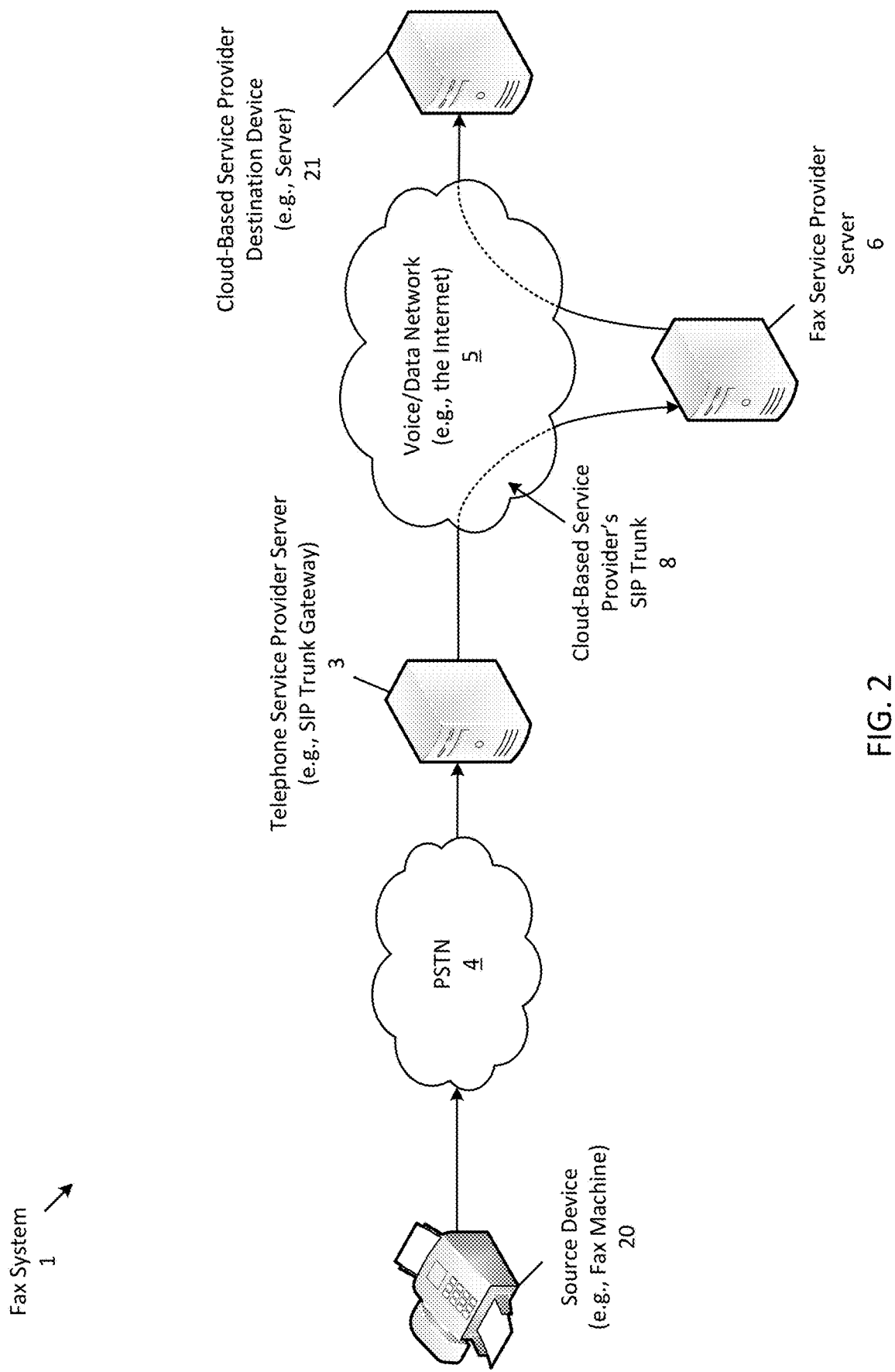
FIG. 2 is a block diagram illustrating the fax system for receiving fax transmissions via the user's SIP trunk, according to some embodiments.

FIG. 2 is a block diagram illustrating the fax system 1 for receiving fax transmissions via the user's SIP trunk, according to some embodiments. In particular, this figure shows a system architecture in which fax transmissions destined to the cloud-based service provider (e.g., fax transmissions that are transmitted to one or more fax telephone numbers owned by the service provider from one or more source devices) are routed by the telephone server to the fax server, which distributes the received fax transmissions to the service provider's destination device 2 (e.g., a desktop computer, server, etc.) As described herein, the fax server 6 may have been designated by the cloud-based service provider as a termination point for one or more fax telephone numbers.

This figure includes at least some of the elements shown in FIG. 1. In addition, this figure shows a source device 20 that is illustrated as a fax machine. In one embodiment, this device may be any electronic device that is capable of placing outgoing calls and/or receiving incoming (e.g., fax) calls over the PSTN 4. For instance, the fax machine 20 may send a fax transmission through the PSTN 4 using a fax protocol such as the Group 3 protocol defined by the International Telecommunications Union telecommunication Standardization Sector (ITU-T) (e.g., as defined in ITU-T Recommendations T.30 and T.4). A user may operate the fax machine to thus send a fax transmission to a recipient, by for example placing a paper document into the fax machine and entering the phone number of the recipient into the fax machine. The fax machine scans the paper document and converts the contents of the document into an electronic fax format. Alternatively, the machine may convert an electronic document into the electronic fax format. The fax machine places an outgoing call by utilizing Dual-Tone Multi-Frequency (DTMF) signaling. Once the call is answered, the fax machine transmits the contents of the document, through the PSTN in the form of audio-frequency tones, as described herein.

Also illustrated is a cloud-based service provider destination device 21, which is shown as a server that is communicatively coupled with the fax server 6 via the data network. In one embodiment, the destination device may be any electronic device that is configured to receive incoming fax transmissions (e.g., as digital data) over a data network, such as a desktop computer, a laptop computer, a tablet computer, a smart phone, etc.

As described herein, this figure is showing the fax server receiving an incoming fax transmission via the cloud-based service provider's SIP trunk 8, and distributing the incoming fax to one or more destination devices (e.g., where at least some of the devices may be associated or owed by the cloud-based service provider). Specifically, the source device 20 may initiate a fax transmission by dialing a fax telephone number associated with the cloud-based service provider. In one embodiment, the fax telephone number may be a number provided by the telephone provider, as part of the service providers commitments with the telephone company, as described herein. Once dialed, the source device sends an incoming call signal, through the PSTN 4, to the telephone server 3. Upon receiving the signal, the server determines that the incoming call is to be routed as a VoIP call, via SIP trunk, to the fax server 6 (e.g., based on preferences within the service provider's account with the telephone provider, as described herein). In response, the telephone server may establish a data connection with the fax server, as described herein. For instance, the telephone server 3 may transmit a signaling protocol invite to the fax server. The fax server may respond to the invite by establishing, over the network 5 a data connection based on the signaling protocol with the telephone service provider server, where the data connection (or rather the SIP trunk through which the connection is established) is owned by the cloud-based service provider. Once established, the telephone server 3 may transmit a message to the source device 20 to begin to transmit the incoming fax. In response, the source device 20 begins to send the fax (e.g., as tones, as described herein). The telephone server routes the incoming fax from the source device, through the SIP trunk 8, to the fax server. In one embodiment, to route the incoming fax, the telephone server may convert the incoming fax signals into digital data (e.g., according to the T. 38 protocol), which is then transmitted to the fax server as one or more data packets. Once the fax has been transmitted, the telephone server may terminate the call with the source device 20 and disconnect the data connection with the fax server 6.

Figure 3:
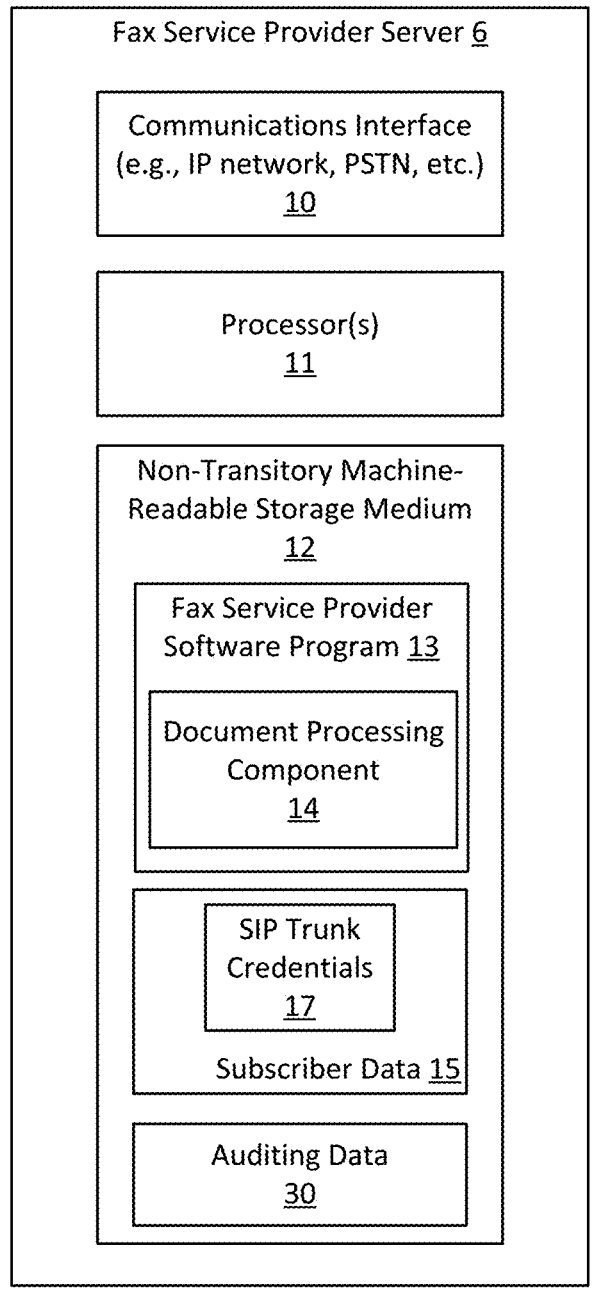
FIG. 3 shows a block diagram illustrating a fax service provider server, according to some embodiments.

In one embodiment, the fax server 6 routes the received incoming fax to one or more destination devices. Specifically, the fax server may determine one or more destination addresses (e.g., an IP address) to which the received fax transmission is to be sent. For example, the fax server may look at subscriber data (e.g., as shown in FIG. 3) associated with the service provider to determine the destination address to which the received fax transmission is to be forwarded. More about using the subscriber data to determine how to forward received fax transmission is described herein. Once a destination address is determined, the fax server transmits the received fax transmission to the destination address (e.g., over the data network). In one embodiment, the fax server may electronically transmit the fax transmission to the destination device 21 using any method, such as one or more methods described herein. For example, upon determining that the destination address is an e-mail address, the fax server may transmit an electronic message that includes the fax transmission as an e-mail.

Although illustrated as being communicatively coupled with the destination device via the data network, in one embodiment, the fax server may be coupled to the device via the PSTN 4. In which case, when forwarding the received fax to a destination address that is a fax telephone number, the fax server may transmit the fax as an analog signal over the PSTN to the fax number. For instance, the fax server may include a dial-up model to transmit a fax via the PSTN. Specifically, the fax server may include software (e.g., fax service provider software program 13, as described in FIG. 3) that may be configured to convert the received fax into a fax file format (if not already in that format), and place an outgoing call using the dial-up model to establish a dial-up connection with a destination device via the PSTN. Once established, the fax server may transmit the fax, as described herein.

FIG. 3 shows a block diagram illustrating the fax service provider server 6, according to some embodiments. In one embodiment, the fax server is operated by one or more fax service providers, and is capable of processing fax transmissions destined to one or more destination devices. In particular, the fax server may process fax transmissions by routing transmissions sent by and/or to subscribers of one or more fax services. For example, the cloud-based service provider (e.g., that owns the SIP trunk 8 and the source device 2) may be a subscriber of one or more services. In one embodiment, fax services (or more specifically the fax service provider) assigns a different Direct Inward Dialing (DID) telephone number (e.g., fax telephone number) to each subscriber. A subscriber may distribute the DID number to others who wish to send a fax message (as an incoming fax transmission) to the subscriber). The DID number is in effect the subscriber's individual fax number. When a sending party sends a fax transmission to the subscriber's DID number (e.g., over the PSTN as described herein), the server receives the fax transmission and generates a fax message from (or decode message content in) the fax transmission. The generated fax message may be in a format that is viewable by the subscriber on an electronic (e.g., destination) device, e.g., PDF, TIFF, etc., and is made available to the subscriber (e.g., for viewing). In the present case, rather than (or in addition to) distributing fax transmissions that are received or sent via the subscriber's DID number, fax transmissions may be distributed using fax telephone numbers that the subscriber receives (or purchases) from a telephone service provider (e.g., of server 3). As described herein, this allows the fax service provider to provide electronic fax services for a subscriber, while allowing the subscriber to continue to meet contractual obligations with (e.g., using telephone services provided by) the telephone service provider (or ITSP). More about these operations are described herein.

The fax server 6 includes a communication interface 10, one or more processors 11, and a non-transitory machine-readable storage medium (or memory) 12. Examples of memory may include read-only memory, random-access memory, CD-ROMs, DVDs, magnetic tape, optical data storage devices, flash memory devices, and phase change memory. Although illustrated as being contained within the server 6, one or more of the components may be a part of a separate electronic device, such as memory 12 being a separate data storage device that is communicatively coupled with (e.g., via the network 5) the server 6. As shown, the memory has stored therein a fax service provider software program (or fax software) 13, subscriber data 15, and auditing data 30. In one embodiment, the fax software is configured to perform one or more of the operations to process (e.g., receive and distribute) incoming fax transmissions, as described herein.

The communications interface 10 provides an interface for the fax server 6 to receive an incoming fax transmission (e.g., from source device 2) and/or to transmit (or distribute) fax transmissions (e.g., to destination device 7) over one or more networks, such as network 5 and PSTN 4, as described in FIGS. 1 and 2. For example, the communication interface may establish a data connection (e.g., such as a VPN connection) with the source device 2 to receive an incoming fax message.

The subscriber data 15 may include information of subscribers of one or more fax services. Specifically, the data may be in the form of a data structure that includes a (e.g., lookup) table having subscriber (e.g., identifying) information, such as a subscriber's name, a subscriber's personal telephone number (which may be associated with a destination/source device), and one or more fax telephone numbers associated with the subscriber (e.g., fax telephone numbers that are assigned by one or more telephone service providers), and a subscriber's assigned (e.g., by the fax service provider) DID telephone number.

In some embodiments, the subscriber's data may include one or more destination addresses to which the fax service provider transmits (e.g., routes, forwards, or distributes) incoming fax transmissions that are received for a specific subscriber. For example, destination addresses may include an e-mail address, a (e.g., voice) telephone number, a fax telephone number, an IP address, etc. In one embodiment, the subscriber data may include subscriber settings or preferences, such as which destination address the subscriber wishes incoming fax transmissions to be distributed by the fax server. In particular, the preferences may indicate which destination addresses a received incoming fax is to be routed by the fax server, as shown in FIG. 2. For instance, the preferences may indicate one or more criteria, which when satisfied indicates which destination addresses the fax server is to distributed a fax. This criterion may include source device information, such as a fax telephone number of the source device that transmitted the fax, or the fax telephone number to which the source device transmitted the fax, as described in FIG. 2. Using this information, the fax server may identify which destination addresses are associated with the information, and use the identified destination addresses to transmit the faxes.

In addition, the subscriber data 15 includes SIP trunk credentials 17. For instance, as described herein, these credentials may include information for authenticating the fax server with the telephone server 3 (e.g., a user name and password, etc.). In one embodiment, the fax server may include credentials from one or more cloud-based service provider who are subscribers of the one or more fax services, as described herein. In which case, the fax server may use one or more SIP trunks for receiving and/or distributing fax transmissions for one or more subscribers.

In some embodiments, the auditing data 30 may include information regarding fax transmissions that have been received, processed, and/or transmitted (or routed) by the fax server 6. For example, the auditing data may be stored in a data structure that includes information, such as time stamps and document information of incoming fax transmissions. More about the auditing data is described herein.

The processor 11 may include one or more data processing circuits, generically referred to herein as "a processor." The processor may execute the fax software 13 that is (at least partially) stored within memory 12 to perform some or all of the fax service provider operations and methods that are described herein, for one or more of the embodiments related to the server 6. In particular, the fax software (e.g., which when executed by the processor 11) is capable of processing fax transmissions received from and/or destined for subscribers of one or more fax services. For instance, the fax software may be configured to receive an incoming fax transmission and distribute the fax transmission to one or more destination devices, as described in FIGS. 1 and 2. The fax software may also be configured to determine how to distribute received faxes, e.g., by using information received with incoming faxes to identify one or more destination addresses from subscriber data 15, as described herein. More about the operations performed by the fax software is described herein.

As shown, the fax program 13 includes a document processing component 14 that is configured to process a received fax transmission. For instance, the received fax transmission may be an electronic message (e.g., via e-mail, communication data connection, etc.). that includes a (e.g., first) searchable electronic document in any format, such as a word processing format, a spreadsheet format, or a presentation format, as described herein. The component generates another (e.g., second) searchable electronic document (e.g., in another file format that is different than the first document's file format) from the first searchable electronic document. For instance, the second searchable electronic document may be a searchable PDF document, which is generated from a word processing document. In one embodiment, the generated second searchable electronic document may preserve (or retain) all formatting of the first document (e.g., font, font size, font color, spacing, margins, alignment, etc.). For instance, the generated searchable PDF document may include embedded fonts from the first searchable electronic document (e.g., word processing document). The component may be configured to add an electronic signature to authenticate the second document, and the second document is transmitted to a destination device. Thus, the routed fax transmission remains a searchable document and includes an electronic signature that authenticates the transmission of the document. This is in contrast to conventional fax transmissions, which are transmitted in non-searchable fax formats, such as TIFFs.

In another embodiment, the document processing component 14 may process incoming faxes that are received as non-searchable fax formats. Specifically, the document processing component may process a received fax to produce a searchable document, which may be routed to one or more destination addresses, as illustrated in FIG. 2. For example, the component may perform Optical Character Recognition (OCR) operations for automatic text recognition of a received fax (e.g., document) to generate an OCR'd document (e.g., a OCR'd searchable PDF document). In another embodiment, the component may also perform Natural Language Processing (NLP) operations in order to determine corresponding text (e.g., data, such as metadata) of semi-structured data, such as tables, diagrams, symbols, images, etc., which may be contained within the fax message. In some embodiments, the fax server may process the fax message according to one or both of OCR and NPL operations in order to produce the searchable electronic document. In one embodiment, the searchable electronic document may be in any file format that is designed to allow a user to search its contents, such as a searchable PDF.

Figure 4:
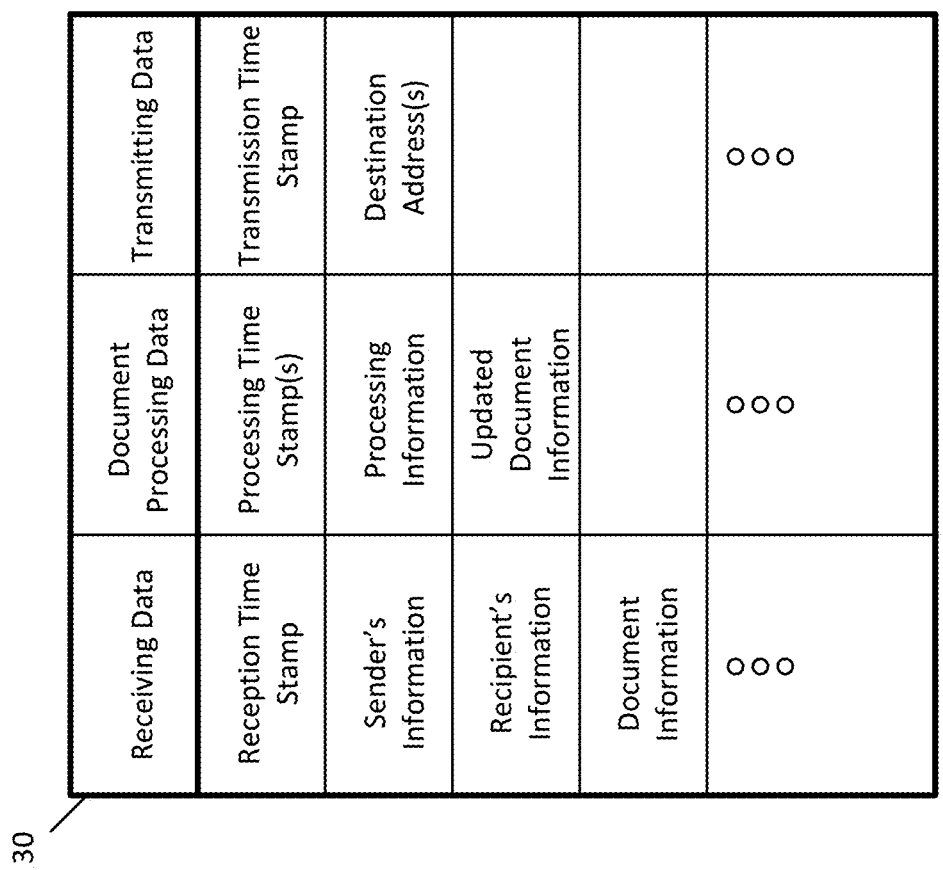
FIG. 4 illustrates a data structure that includes auditing data associated with the processing of the fax transmission, according to some embodiments.

FIG. 4 illustrates a data structure that includes auditing data 30 associated with the processing of the fax transmission, according to some embodiments. Specifically, the data structure includes a table that includes data regarding an incoming fax transmission to the fax server 6. As shown, the table includes receiving data, document processing data, and transmitting data. The receiving data includes information regarding a received incoming fax transmission, which includes a reception time stamp that indicates a time at which the fax transmission was received, sender's (or source) information, such as a phone number or e-mail address of the sender, recipient's information that may include a fax telephone number to which the incoming fax transmission is being sent, and document information that includes information regarding the incoming fax transmission, such as the number of pages, document type, etc. In one embodiment, the server 6 may determine and store the receiving data upon receiving the incoming fax.

The document processing data may include information regarding when and how an incoming fax transmission is processed by the fax server. For example, the processing data may include processing time stamp(s) that indicate when a document is processed, processing information that indicates how the document is processed (e.g., indicating that a first searchable electronic document is converted into a second searchable electronic document and what format the document is converted from and into, etc.), and updated document information (e.g., indicating that the processed document's page size changed from five pages to six pages, etc.). The transmitting data may include information regarding the transmission (or routing) of the fax transmission, which may include a transmission time stamp and destination address(es) to which the fax has been routed. In one embodiment, more or less information may be stored within the data structure.

Figure 5:
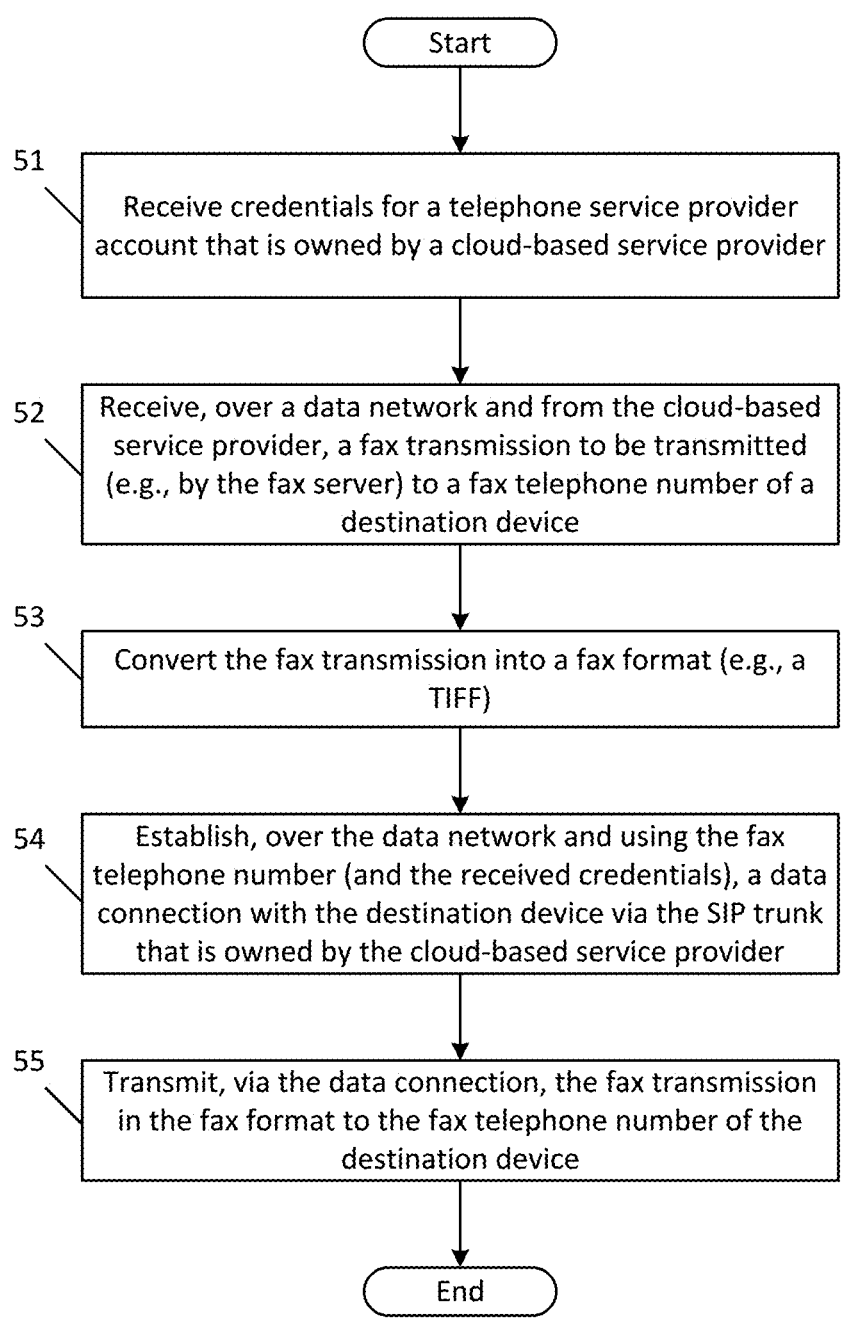
FIG. 5 is a flowchart of one embodiment of a process to transmit a fax transmission to a destination device via the SIP trunk that is owned by the user.

FIGS. 5 and 6 are flowcharts of processes 50 and 60 for receiving and distributing incoming fax transmissions, according to some embodiments. These processes may be performed by the (e.g., fax service provider software program 13 of the) fax service provider server 6 of the fax system 1, as described in FIGS. 1-4. For example, the (e.g., document processing component 14 of the) fax software 13 that is being executed by one or more processors 11 of the server 6 may perform at least some of the operations described herein.

FIG. 5 is a flowchart of one embodiment of the process 50 to transmit a fax transmission to a destination device via the SIP trunk that is owned by the user. Specifically, at least some of the operations may be performed by the fax server 6, as described in FIG. 1. The process 50 begins by the fax server receiving credentials for a telephone service provider account that is owned by a cloud-based service provider (at block 51). Specifically, the cloud-based service provider may transmit (e.g., via an electronic message) credentials, such as a user name and password, that are associated with the providers account in order to allow the fax server access to the provider's SIP trunk. The fax server receives, over a data network and from the cloud-based service provider, a fax transmission to be transmitted (e.g., by the fax server) to a fax telephone number of a destination device (at block 52). For instance, the source device 2 may transmit an electronic message (e.g., an e-mail) that includes a fax file and additional information, such as a fax telephone number as a destination address. The fax server converts the fax transmission into a fax format, such as a TIFF (at block 53). For example, the fax file received by the source device may be a document in any document format, such as PDF. Since the document, however, is to be transmitted as an analog signal, the fax program converts the document into a format that may be faxed as the signal. In one embodiment, this operation is operational. For instance, when the fax file is already in a fax format, the fax program may omit this step.

The fax server establishes, over the data network 5 and using the fax telephone number (and the received credentials), a data connection with the destination device via the SIP trunk that is owned by the cloud-based service provider (at block 54). In particular, the fax program may transmit, over the data network, a signaling protocol invite to the telephone service provider that includes 1) the fax telephone number to which the fax server is to be communicatively coupled in order to transmit the fax, and 2) the credentials for authorizing (or authenticating) the fax service provider to transmit the fax transmission via the cloud-based service provider's SIP trunk. In one embodiment, the credentials may be transmitted using any message from the fax server to the telephone provider. For instance, the telephone provider may authenticate the fax server after the data connection is established. In another embodiment, the telephone provider may not authenticate the fax server every time a fax transmission is to be transmitted using the cloud-based service provider's SIP trunk. For instance, the connection may remain open for a period of time once established. In which case, one or more (additional) fax transmissions may be sent by the fax server to one or more destination devices (and/or received through the established connection), as described herein. The fax server transmits, via the data connection, the fax transmission in the fax format to the fax telephone number of the destination device (at block 55). The fax may be transmitted as an analog signal (e.g., audio-frequency tones) across the SIP trunk 8 and the PSTN 4 to the destination device.

As described herein, the established connection may remain open (or active) for a period of time, allowing future fax transmissions to be routed via the connection (e.g., for at least a period of time). Specifically, upon receiving another fax transmission to be routed to a (e.g., telephone number) of a destination device, the fax server may determine whether the new fax transmission is to be transmitted via the established data connection. For example, the received fax transmission may include credentials of a cloud-based service provider (e.g., subscriber of fax services), where the fax server may determine whether the credentials are associated with (e.g., an account owned by) the service provider for which the original connection was established. In particular, the fax server may determine whether the newly received credentials match the credentials that were used to establish the original connection. If so, the fax transmission may be routed via the established connection.

If, however it is determined that the fax transmission is not to be transmitted via the established data connection (e.g., the credentials do not match, meaning that this new fax transmission may be associated with a different cloud-based service provider than the one that owns the established data connection), the fax server may establish another data connection using another SIP trunk to transmit the fax transmission. For example, the fax server may determine whether the different (or second) service provider has credentials, if so, those credentials may be used to establish the new connection. As a result, the fax server may route all future fax transmissions received from first (or original) service provider via the first data connection, and may route all future fax transmission received from the second service provider via the new connection. This ensures that fax transmissions are routed according to service provider.

FIG. 6 is a flowchart of one embodiment of a process to receive a fax transmission from a source device via the SIP trunk that is owned by the user. In particular, at least some of the operations may be performed by the fax server, as described in FIG. 2. The process 60 begins by the fax server receiving a signaling protocol invite from a telephone service provider (e.g., the provider server 3) in response to the telephone service provider receiving, over a circuit switched network (e.g., PSTN 4) and from a source device, an incoming call signal to a fax telephone number of the cloud-based service provider (at block 61). For instance, upon the telephone server receiving the incoming call signal, the server may determine (before or after answering the call) that the call is to be terminated (or routed) to the fax server. In one embodiment, the determination may be based on the fax telephone number to which the incoming call was placed by the source device. Specifically, the telephone server may make this determination based on preferences of a client (e.g., the cloud-based service provider) that owns the telephone numbers. Once determined, the telephone server may transmit the invite to an address (e.g., IP address, domain name, etc.) associated with the fax server (which may be determined from the client preferences).

The fax server responds to the invite by establishing, over the data network 5, a data connection based on the signaling protocol (associated with the invite) with the telephone service provider, where the data connection is owned by the cloud-based service provider (at block 62). Specifically, the data connection may be through the cloud-based service provider's SIP trunk, which is provided by the telephone provider. The fax server receives, through the data connection, an incoming fax transmission that is in a fax format and is routed by the telephone service provider as the source device transmits an incoming fax message via the incoming call signal over the circuit switched network (at block 63). As described herein, once the data connection is established, the source device may transmit the fax message as audio-frequency tones as the incoming call signal through the SIP trunk to the fax server.

The fax server transmits, over the data network, the fax message to a destination address (at block 64). For example, when the destination address is an IP address or a domain name, the fax server may establish, over network 5 and using the IP address or the domain name, another data connection with the destination device, and transmit the fax message via the established connection. More examples as to how the fax sever may transmit the fax message is described herein.

In one embodiment, the fax server may determine one or more destination addresses to which the fax message is to be transmitted. As described herein, the fax server may make this determination based on information received with the fax, such as the (fax) telephone number of the source device and the fax telephone number to which the fax message was transmitted by the source device (e.g., a telephone number associated with the SIP trunk). In which case, the fax server may use the information to perform a table lookup into the subscriber data 15 to determine one or more destination addresses are associated with the information.

In another embodiment, rather than (or in addition to) transmitting the fax message to the destination address, the fax server may make the fax message available to a subscriber (e.g., the cloud-based service provider) through various means. In one embodiment, the fax server may transmit the fax message to an e-mail address (e.g., a destination address) of the subscriber. In another embodiment, the fax server may store the fax message in a data storage (e.g., memory 12) until it is accessed there by the subscriber over the computer network 5. For example, the fax message may remain stored on a web server accessible over the Internet. In another embodiment, a notification is sent to (addressed to) the subscriber that indicates that a new fax message is available, such as a Short Message Service (SMS) message. In one embodiment, the notification may include information as to how to access the new fax message (e.g., an e-mail notification may contain a link, such as a Uniform Resource Locator (URL), to the stored location of the fax message). In another embodiment, the notification may be transmitted as any type of electronic message (e.g., a SMS message, a Multimedia Messaging Service (MMS) message, etc.) to a known telephone number associated to the subscriber. In this case, the electronic message may include the information mentioned above, such as a URL. In another embodiment, the messages (e.g., MMS messages) may include the generated fax message as an attachment.

In some embodiments, the fax server 6 may distribute incoming fax transmissions according to one or more (e.g., international) standards for data transfers. In particular, when distributing incoming fax transmissions to healthcare service providers (or systems), such as doctors, Electronic Medical Record (EMR) systems (or Electronic Healthcare Records (EHR) systems), healthcare insurers, doctors, medical technicians, pharmacists, etc., the fax server may generate and transmit electronic messages that include at least a portion of the incoming fax transmission according to the one or more international medical format messaging standards, such as Health Level Seven (HL7) standard, Digital Imaging and Communication in Medicine (DICOM) standard, etc. For example, upon receiving an incoming fax transmission that includes a fax file (e.g., a medical or patient record) that is to be routed to a EMR service provider (e.g., server), the fax software may generate a HL7 message that includes the fax file. In one embodiment, to generate the HL7 message, the fax server may embed the fax file into one or more segments of an HL7 message. For instance, when the fax file is a PDF file that includes medical data (e.g., text, images, etc.), the fax software may embed the (e.g., medical data of the) file into the HL7 message. In one embodiment, the fax software may attach (or embed) any type of file format into an HL7 message in order to generate the electronic message. In some embodiments, along with the fax file, patient information may also be added into the message, such as the fax telephone number. Once the electronic HL7 message is generated, the fax server may transmit the message to a destination device (or address) according to one or more (TCP/IP).

In one embodiment, in addition to (or in lieu of) transmitting the fax file as a HL7 message, the fax server may convert (or generate) the fax file into another document type (or format). In particular, the fax server may convert the fax file into a HL7-Clinical Document Architecture (CDA) document that is a HL7 standard for the representation and machine processing of clinical documents. For instance, the fax server may encode (or embed) the fax file, which may be any file format such as a PDF, TIFF, word processing format, etc., as the body of the HL7-CDA document. In one embodiment, transmitting a HL7-CDA document may be preferable rather than simply transmitting the fax file (e.g., word processing document), since metadata may be added to a header of the HL7-CDA document, such as the fax telephone number.

In some embodiments, the fax server 6 may distribute (and/or receive) fax files as secure direct messages in order to protect sensitive information. For instance, the fax server may generate and transmit secure messages that are Health Insurance Portability and Accountability (HIPPA) compliant. For instance, the fax server may encrypt the fax file according to HIPAA requirements, and may transmit the encrypted file across a secure connection to a destination address (e.g., via HTTPS). In one embodiment, the fax server may use any known method to encrypt (and/or decrypt) fax files in order to produce secure messages.

Some embodiments perform variations of the processes 50 and/or 60. For example, the specific operations of at least some of these processes may not be performed in the exact order shown and described. The specific operations may not be performed in one continuous series of operations, some operations may be omitted, and different specific operations may be performed in different embodiments. For example, the fax server may perform auditing operations during one or more steps of the processes. As an example, upon receiving the incoming fax message, the server may determine and store a reception time stamp that indicates the time at which the message was received. At or after each step the server may store information regarding the operation(s) performed at that step as the auditing data 30.

An embodiment may be an article of manufacture in which a non-transitory machine-readable storage medium has stored thereon instructions which program one or more data processing components (generically referred to here as "a processor") to perform the operations described above. For example, in one embodiment, the above-described processes 50 and 60 of FIGS. 5 and 6, respectively may be performed by the processor 11 that is executing instructions stored in the non-transitory machine-readable storage medium. The non-transitory machine-readable storage medium may be a part of the fax server 6, as described herein. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a fax server of a fax service provider, the fax server is executing fax processing software, the method comprising:
   receiving a signaling protocol invite from a telephone service provider in response to the telephone service provider receiving, over a circuit switched network and from a source device, an incoming call signal to a fax telephone number of a cloud-based service provider;
   responding to the invite by establishing, over a data network, a data connection based on the signaling protocol with the telephone service provider, wherein the data connection is owned by the cloud-based service provider;
   receiving, through the data connection, an incoming fax message that is in a fax format and is routed by the telephone service provider as the source device transmits the incoming fax message via the incoming call signal over the circuit switched network; and
   transmitting, over the data network, the fax message to a destination address.

2. The method of claim 1 further comprising determining the destination address to which the fax message is to be transmitted based on the fax telephone number.

3. The method of claim 1, wherein the data connection is a first data connection, wherein the destination address is an Internet Protocol (IP) address or a domain name, wherein transmitting the incoming fax message comprises:
   establishing, over the data network and using the IP address or the domain name, a second data connection with the destination device; and
   transmitting the incoming fax message via the second data connection.

4. The method of claim 3, wherein the incoming fax message is transmitted according to an encryption protocol, wherein the encryption protocol comprises one of a Secure Sockets Layer (SSL) protocol or a Transport Layer Security (TLS) protocol.

5. The method of claim 1, wherein the data connection is a part of a session initiation protocol (SIP) trunk purchased from the telephone service provider by the cloud-based service provider.

6. The method of claim 1, wherein the signaling protocol is one of a H.323 protocol, media gateway control protocol (MGCP), and session initiation protocol (SIP).

7. The method of claim 1, wherein the fax message is transmitted according to T.38 protocol.

8. A fax system comprising:
   a processor; and
   non-transitory machine-readable storage medium having instructions stored therein which when executed by the processor causes the system to receive a signaling protocol invite from a telephone service provider in response to the telephone service provider receiving, over a circuit switched network and from a source device, an incoming call signal to a fax telephone number of a cloud-based service provider, respond to the invite by establishing, over a data network, a data connection based on the signaling protocol with the telephone service provider, wherein the data connection is owned by the cloud-based service provider, receive, through the data connection, an incoming fax message that is in a fax format and is routed by the telephone service provider as the source device transmits the incoming fax message via the incoming call signal over the circuit switched network, and transmit, over the data network, the fax message to a destination address.

9. The fax system of claim 8, wherein the non-transitory machine-readable storage medium has further instructions to
determine the destination address to which the fax message is to be transmitted based on the fax telephone number.

10. The fax system of claim 8, wherein the data connection is a first data connection, wherein the destination address is an Internet Protocol (IP) address or a domain name, wherein the instructions to transmit the incoming fax message comprises instructions to
establish, over the data network, and using the IP address or the domain name, a second data connection with the destination device; and
transmitting the incoming fax message via the second data connection.

11. The fax system of claim 10, wherein the incoming fax message is transmitted according to an encryption protocol, wherein the encryption protocol comprises one of a Secure Sockets Layer (SSL) protocol or a Transport Layer Security (TLS) protocol.

12. The fax system of claim 8, wherein the data connection is a part of a session initiation protocol (SIP) trunk purchased from the telephone service provider by the cloud-based service provider.

13. The fax system of claim 8, wherein the signaling protocol is one of a H.323 protocol, media gateway control protocol (MGCP), and session initiation protocol (SIP).

14. The fax system of claim 8, wherein the fax message is transmitted according to T.38 protocol.

15. A method performed by a fax server of a fax service provider, the fax server is executing a fax processing software, the method comprising:
establishing, over a data network, a first data connection with a source device that is owned by a cloud-based service provider;
receiving, over a data network and via the first data connection, a fax transmission to be transmitted to a fax telephone number of a destination device;
converting the fax transmission into a fax format;
establishing, over the data network and using the fax telephone number, a second data connection with the destination device via a session initiation protocol (SIP) trunk that is owned by the cloud-based service provider; and
transmitting, via the second data connection, the fax transmission in the fax format to fax telephone number of the destination device.

16. The method of claim 15,
wherein the second data connection is a Virtual Private Network (VPN) connection, and
wherein the fax transmission is received according to an encryption protocol, wherein the encryption protocol comprises one of a Secure Sockets Layer (SSL) protocol or a Transport Layer Security (TLS) protocol.

17. The method of claim 15 further comprising receiving credentials for a telephone service provider account that is owned by the cloud-based service provider, wherein establishing the second data connection comprises transmitting, over the data network, a signaling protocol invite to the telephone service provider that includes 1) the fax telephone number and 2) the credentials for authorizing the fax service provider to transmit the fax transmission via the cloud-based service provider's SIP trunk.

18. The method of claim 15, wherein the fax transmission is a first fax transmission, the fax telephone number is a first fax telephone number, the SIP trunk is a first SIP trunk, and the destination device is a first destination device, wherein the method further comprises receiving, over the data network, a second fax transmission to be transmitted to a second fax telephone number of a second destination device;
determining whether the second fax transmission is to be transmitted via the second data connection; and
in response to determining that the second fax transmission is not to be transmitted via the second data connection, transmitting, over the data network and via a third data connection to the second fax telephone number using a second SIP trunk.

19. The method of claim 18 receiving credentials of a telephone service provider account for transmitting the second fax transmission, wherein determining whether the second fax transmission is to be transmitted via the second data connection comprises determining whether the credentials are associated with an account owned by the cloud-based service provider.

20. The method of claim 18, wherein the cloud-based service provider is a first cloud-based service provider, wherein the second fax transmission was received from a second cloud-based service provider, wherein the method further comprises routing all future fax transmissions received from the second cloud-based service provider for transmission only via the third data connection for at least a period of time.

* * * * *